Aug. 30, 1932.          G. M. STEEL          1,874,137
                     FEEDER FOR FARM STOCK
                       Filed June 26, 1931
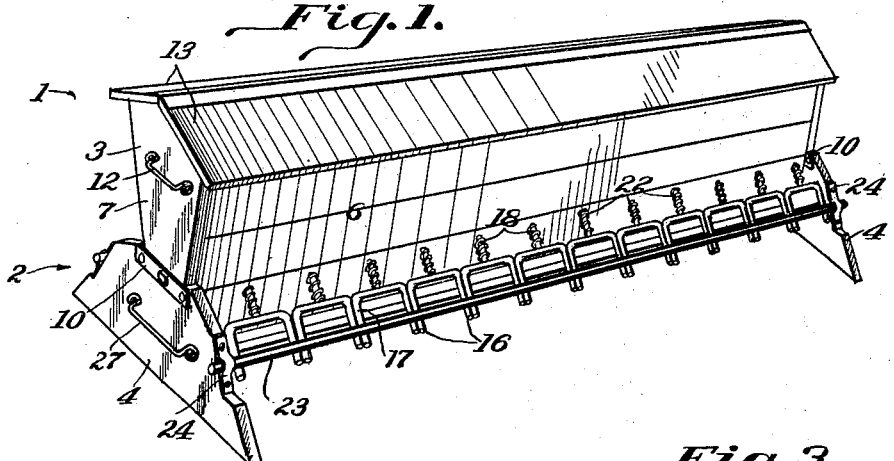
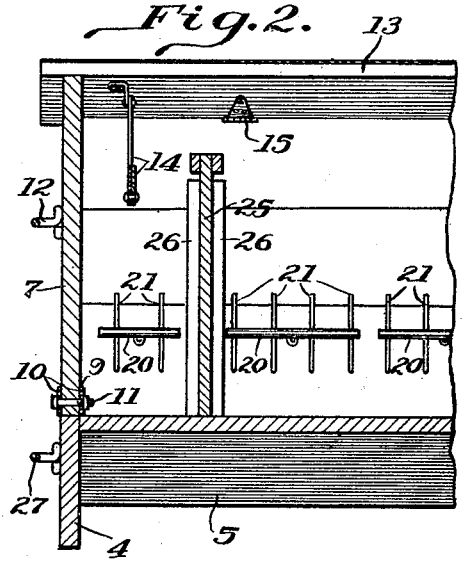
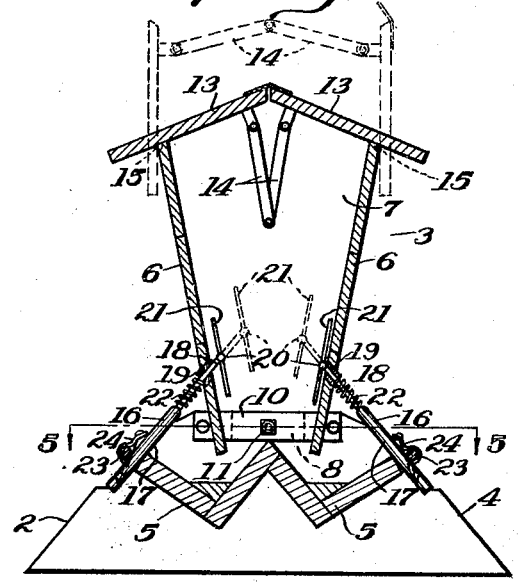
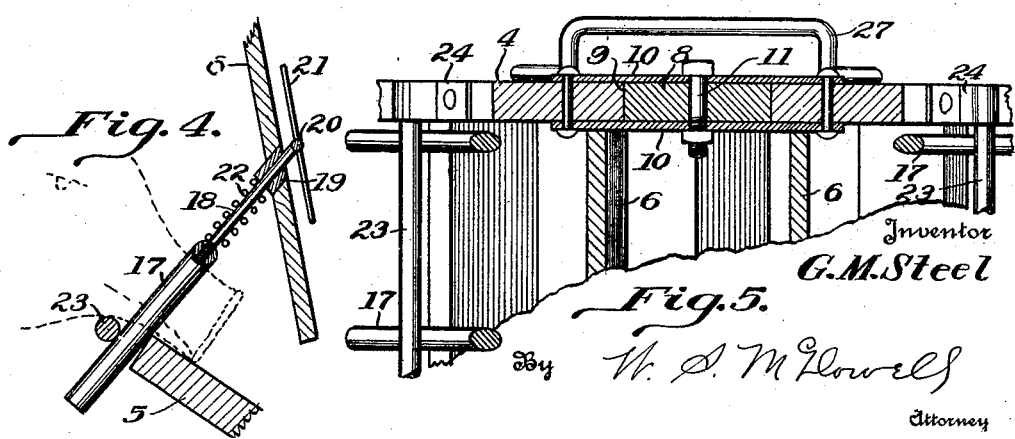
Inventor
G. M. Steel
By W. S. McDowell
Attorney Patented Aug. 30, 1932

1,874,137

UNITED STATES PATENT OFFICE

GLADSTONE M. STEEL, OF CHILLICOTHE, OHIO

FEEDER FOR FARM STOCK

Application filed June 26, 1931. Serial No. 546,967.

This invention relates generally to hog feeders and has for one of its outstanding objects to provide a gravity feeder for hogs, pigs or other farm animals which will be strong and durable in construction, comparatively simple in its arrangement, automatic in operation and which can be manufactured and sold at a comparatively low cost.

It is another object of the invention to provide a farm feeding device of the character specified consisting of a base or trough structure carrying a stationary hopper, near the lower end of which is located a plurality of agitating elements which have their operating portions lying across the feeding space between the hopper and the trough structure so that the animals, in order to obtain the feed, must engage the agitating elements and by their restless movements the agitating elements will be raised or lowered to provide for the gravity flow of the feeding material into the feeding troughs arranged below the lower longitudinal edges of the hopper.

A further object of the invention lies in the provision of a feeder of this kind wherein the base and the hopper are detachably connected to one another so that the hopper may be removed from the base when the cleaning of the feeding troughs is desired. Further, by this removable connection the unit may be taken apart to facilitate the handling and transportation thereof from one place to another.

A still further object of the invention is to divide the hopper of the feeder into a plurality of separate compartments by the positioning of removable panels or partitions transversely of the hopper so that feeding materials of various types or grades may be held therein, agitated and consumed by the animals at will.

With these and other objects in view, which will appear as the description proceeds, the invention consists in the novel features of construction, combinations of elements and arrangements of parts hereinafter to be more fully described and pointed out in the appended claims.

In the accompanying drawing:

Figure 1 is a perspective view of the feeder comprising the present invention,

Figure 2 is a vertical longitudinal sectional view taken through one end thereof, Figure 3 is a transverse sectional view thereof, Figure 4 is a detailed transverse sectional view taken through one of the agitating elements, Figure 5 is a horizontal sectional view taken through one end of the structure as indicated by the line 5—5 of Figure 3.

Referring more particularly to the drawing, the numeral 1 designates my improved hog feeder in its entirety. The feeder is formed to comprise a base generally designated by the numeral 2 and arising from this base is the stationary feed receiving hopper 3, the latter being detachably connected with the base to facilitate cleaning and handling of the device. The base 2 comprises in this instance a pair of end members 4 between which a pair of longitudinally extending substantially V-shaped trough members 5 are supported. The end members 4 serve as supporting legs for the device and also serve as closures for the ends of the trough members 5, which latter members may be joined to one another and to the end members 4 into an integral structure by nails and other fastening devices commonly employed in the assembly of devices of this kind.

The feed receiving hopper 3 comprises a hollow body having downwardly converging side walls which produce a restricted outlet in the lower portion of the hopper. The downwardly converging side walls of the hopper are indicated by the numerals 6 and these walls are connected at their ends with substantially triangularly shaped, vertically disposed end walls 7. The lower ends of these walls are formed with depending tongues 8 which are received within recesses 9 formed in the upper edges of the end members 4. To strengthen these upper edges and to provide for a socket connection between the end walls 7 and the members 4 there is attached to said edges metallic plates 10 which are arranged to overlie the meeting edges of the end walls 7 and the end members 4. Connecting the plates 10 and extending through the lugs 8 are bolts 11 by which the hopper structure 3 is connected to the base section 2 and by the removal of which the said receiving hopper may be lifted bodily free from the base section by the grasping of the handles 12 attached to the end walls 7 of the hopper.

The hopper has its upper end normally closed by means of a pair of hinged lid sections 13 which are arranged at a slight angle to one another to shed water and which are of such width that the water draining therefrom will fall exterior of the trough members 5. The lid sections 13 are connected by a pair of links 14, which when the lid sections are in an open position will relieve the strain upon the hinges 15 and also serve to hold said lid sections in an open or vertical position as indicated by dotted lines in Figure 3. The lid sections may be held in this position by springing the links so that their connecting ends will be located at the point above the ends connected to the lids. It will be obvious that in the closing of the lid sections, the links 13 are again sprung to their normal positions permitting the folding of the lid sections to a hopper closing position.

To provide for the positive advance of the feeding materials from the hopper 3 into the trough 5, there is arranged across the spaces provided between said trough and the lower portion of the hopper, a plurality of agitating elements 16 capable of being individually operated by the heads of the animals and in which each of these agitating elements comprises an inverted U-shaped member 17 having a stem 18 connected therewith at its upper end, which stem is slidably positioned within the bearing opening 19 formed in the lower portion of the side wall of the hopper. Attached to the inner end of this stem 18 is a bar 20 carrying a plurality of fingers 21 which are arranged under normal conditions to lie adjacent the inner surface of said wall. Coil springs 22 may be interpositioned between the walls and the U-shaped member to effect the positive retraction thereof when permitted to be lowered or moved outwardly by the animal. These U-shaped agitating elements or members are arranged adjacent one another and guided for reciprocatory movement by a longitudinally extending rod 23 which is arranged exterior of the members 17 and has its ends anchored within bearings or straps 24 attached to the end members 4 of the base. The rod 23 will serve to hold the agitating members in their respective place with relation to one another and also form a rest or guide rail for the heads of the animals in entering the trough members.

It will be seen that as the animals approach the feeder, they will position their heads above the rod 23 and within the U-shaped members and in order to get at the feed they must raise the members 17 causing the compression of the springs 22 and moving the agitating fingers 21 within the hopper to effect the positive agitating of the feed therein so that the same may gravitate readily into the trough structure 5. The restless motion of the animals will, of course, cause the agitating elements to reciprocate, effecting the gravitation of the feed at that point. In order to accommodate various grades of feeds, the hopper may be divided into a plurality of compartments by the positioning of transverse panels or partitions 25 therein which are slidably held in place between cleats 26 and may be removed or maintained therein depending, of course, upon the kinds of material used within the hopper.

In view of the foregoing it will be seen that the present invention provides a farm stock feeder of simple yet efficient construction which may be readily maintained in an operating condition for prolonged periods without mechanical disorders. The construction is essentially simple, provides for the positive feeding of the material into the trough structures of the device and is delivered in accordance with the demand of the feeding animals, thereby effectively preventing waste of the material. Due to the detachable connection between the trough structure and the hopper, the same may be readily taken apart to facilitate the cleaning of the device and to effect the ready handling thereof when moved from one place to another. Such handling is readily effected by the provision of the handles 12 on the hopper and the handles 27 of the base structure.

What is claimed is:

1. A farm stock feeder comprising a base, trough members carried by said base, a hopper supported in conjunction with said base and carried above said trough structure, a plurality of agitating elements having their operating portions positioned in the entrance space between said hopper and trough structures, each of said agitating elements comprising an inverted U-shaped member guided for movement at its lower end in connection with the trough structure, a stem attached to the upper end of said U-shaped member and slidably received within a bearing opening formed in the lower portion of said hopper, agitating fingers carried by the inner end of said stem, and a spring interposed between said U shaped member and hopper.

2. A farm stock feeder comprising a base member, said base including a pair of longitudinally extending trough members connected to one another along their inner longitudinal edges, a feed receiving hopper carried by said base and arranged above said troughs, agitating elements connecting said troughs and hopper, each of said agitating elements comprising a substantially U-shaped member invertedly positioned across the entrance space of a trough, a stem connected with said U-shaped member slidably received within a bearing formed in the lower portion of the side wall of said hopper, a plurality of agitating fingers carried by the inner end of said stem, and means for guiding the lower portion of said U-shaped member for reciprocatory movement effected by the feeding animals.

3. A farm stock feeder comprising a base, said base including a pair of longitudinally extending trough members closed at their ends by a pair of transversely extending trough supporting members, said trough supporting members being formed with recesses at their upper ends, a feed receiving hopper arranged above said troughs and provided with end walls having lugs depending from their lower ends, said lugs being received within said recesses, plates attached to said trough supporting members and arranged on each of the sides of said recesses to provide together with said recesses sockets for said tongues, and fastening elements passing through said plates and tongues and serving to hold said hopper in a detachable relation with said base.

4. A farm stock feeder comprising a base member, said base including a pair of longitudinally extending trough members connected to one another along their inner longitudinal edges, a feed receiving hopper carried by said base and arranged above said trough, agitating elements connecting said trough and hopper, each of said agitating elements comprising a stem arranged transversely of the trough and slidably received for reciprocatory action within bearing openings formed in the lower portion of the side wall of said hopper, an agitating finger carried by the inner end of said stem, and a member attached to the outer end of said stem and including a bar extending longitudinally of said trough, said bar being adapted for engagement by the snouts of the animals to effect the reciprocatory movement of said agitating element.

5. A farm stock feeder comprising a base member, said base including a longitudinally extending trough member, a feed receiving hopper carried by said base and arranged above said trough, agitating elements connecting said hopper and trough and extending transversely across the entrance space of the latter, each of said agitating elements having a stem guided for reciprocatory movement in connection with said hopper and trough, an agitating finger carried by the inner end of said stem, and a member carried by the outer end of said stem which is bent to provide a loop for the reception of the snout of the animal feding out of said trough.

In testimony whereof I affix my signature.
GLADSTONE M. STEEL.